United States Patent
Hilton et al.

(10) Patent No.: US 9,403,287 B2
(45) Date of Patent: Aug. 2, 2016

(54) PROCESS FOR FORMING AN ARTIFICIAL REEF

(71) Applicants: Thomas J. Hilton, Arcola, TX (US); Wayne Bauer, Cape Coral, FL (US)

(72) Inventors: Thomas J. Hilton, Arcola, TX (US); Wayne Bauer, Cape Coral, FL (US)

(73) Assignee: ATLANTIS MARINE HABITATS, LLC, Arcola, TX (US)

(*) Notice: Subject to any disclaimer, the term of this patent is extended or adjusted under 35 U.S.C. 154(b) by 0 days.

(21) Appl. No.: 14/938,543

(22) Filed: Nov. 11, 2015

(65) Prior Publication Data

US 2016/0067883 A1    Mar. 10, 2016

Related U.S. Application Data

(63) Continuation of application No. 14/291,958, filed on May 30, 2014.

(51) Int. Cl.
*A01K 61/00* (2006.01)
*B28B 1/32* (2006.01)
*E02B 3/04* (2006.01)

(52) U.S. Cl.
CPC .. *B28B 1/32* (2013.01); *E02B 3/046* (2013.01)

(58) Field of Classification Search
CPC .... A01K 61/006; A01K 61/007; E02B 3/046; E02B 3/129; B28B 1/32; B29C 41/08
See application file for complete search history.

(56) References Cited

U.S. PATENT DOCUMENTS

| 2,069,715 | A |   | 2/1937  | Arpin |
|-----------|---|---|---------|-------|
| 3,888,209 | A |   | 6/1975  | Boots |
| 4,244,993 | A | * | 1/1981  | Platka, III ............... B29C 41/22 264/138 |
| 4,997,311 | A |   | 3/1991  | Van Doren |
| 5,173,006 | A |   | 12/1992 | Lowe |
| 5,259,695 | A |   | 11/1993 | Mostkoff |
| 5,454,665 | A |   | 10/1995 | Hughes |
| 5,836,265 | A | * | 11/1998 | Barber ................ A01K 61/006 119/221 |
| D417,314  | S | * | 11/1999 | Smith, Jr. .................... D30/106 |
| 6,186,702 | B1 |  | 2/2001  | Bartkowski |
| 6,464,429 | B2 |  | 10/2002 | Moore |
| 6,896,445 | B1 |  | 5/2005  | Engler |
| 7,513,711 | B1 |  | 4/2009  | Walter |
| 7,828,493 | B1 |  | 11/2010 | Brignac |

* cited by examiner

*Primary Examiner* — Rodney Mintz
*Assistant Examiner* — Daniel Kenny
(74) *Attorney, Agent, or Firm* — Egbert Law Offices, PLLC (57) ABSTRACT

A process for forming an artificial reef includes the steps of forming a form having a geometric shape, applying at least one blockout onto a surface of the form such that the blockout extends outwardly of the surface of the form, applying a sprayable concrete over the form and the blockout, curing the sprayable concrete on the form for a period of time, removing the blockout from the surface of the form and from the cured sprayable concrete, and removing the form from the cured sprayable concrete. A base is formed having an upper surface. The lower end of the form is positioned upon the base. The sprayable concrete is sprayed over the upper surface of the base.

8 Claims, 5 Drawing Sheets

PROCESS FOR FORMING AN ARTIFICIAL REEF

CROSS-REFERENCE TO RELATED APPLICATIONS

The present application is a continuation of U.S. patent application Ser. No. 14/291,958, filed on May 30, 2014, and entitled "Process for Forming an Artificial Reef", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to artificial reefs. Additionally, the present invention relates to processes for forming such artificial reefs. More particularly, the present invention relates to processes for forming artificial reefs in which a sprayable concrete is used for the formation of the artificial reef.

2. Description of Related Art Including Information Disclosed Under 37 CFR 1.97 and 37 CFR 1.98.

An artificial reef is a man-made structure typically built to promote marine life in areas having generally featureless bottoms. Artificial reefs are used to control erosion and/or to improve surfing. Many reefs are built by using objects that were built for other purposes, for example, by sinking oil platform jackets, scuttling ships, or by deploying rubble or construction debris.

Scuttling ships is an extremely costly and time-consuming way to produce an artificial reef since there are many logistical hurdles to be overcome due to stringent governmental regulations. The ships must be stripped clean of any and all potential pollutants. As a result, the engines and fuel tanks must be removed. PCBs are common substance in many older ship designs. These PCBs must be removed before the ship is scuttled. There also minimum depth requirements set forth by the USCG which makes the structures undesirable for deployment in waters less than 150 feet.

The Rigs-to-Reefs program has been very successful as a result of state fishery agencies working closely with oil companies to help defray the cost of deploying these offshore large structures. This can be attractive to oil companies since many times the cost of deploying is less than the cost of bringing the rigs back inshore and sold for scrap. This type of reef has minimum depth requirements, stringent regulations regarding the removal of contaminants, and is very costly to deploy.

Designed artificial reefs can be placed in shallower waters and are meant to provide the underlayment for the development of what eventually will considered a "natural" reef by incorporating elements conducive to making this happen. Artificial reefs divert the current flow in order to provide adequate cover and refuge so as to allow small marine creatures to gain a foothold instead of being continually swept along with the ocean currents. These artificial reefs are placed above the flat, featureless ocean floor. Artificial reefs are designed to stand alone or be deployed in unison with a number of other reefs and/or placement of low relief material, such as rubble or concrete culverts. Concrete is a good material used for artificial reef construction, but it has inherent issues since it lacks correct pH values in addition to being too hard for benthic marine organisms to bore into. As such, it is very important to provide natural soft limestone as a primary surface materials.

Artificial reefs are somewhat expensive to be produced. Typically, a metal infrastructure is required for the artificial reef. Typically, a metal infrastructure is installed within a mold and concrete is poured around the metal infrastructure. Unfortunately, this metal infrastructure can degrade over time because of contact with salt water. As a result, the artificial reef can degrade over time. Typically, the construction of such artificial reefs requires a number of persons to complete. The curing time for the concrete can be several days. As such, production of such artificial reefs is very expensive, time-consuming and labor-intensive. Still further, where metal infrastructure is utilized in the artificial reef, welding is required. This welding will degrade because of contact with the saltwater. Additionally, the cost of steel associated with such a metal infrastructure makes the artificial reefs very expensive.

In certain circumstances, solid triangular blocks of concrete are utilized as artificial reefs. Typically, these solid blocks can cause proper interruption of the ocean current, but lack an area on the interior thereof whereby small marine animals can develop. In those artificial reefs that have an internal chamber, turtles can become trapped. As such, such structures lack proper turtle escape hatches whereby turtles can escape from the interior of such artificial reefs. Still further, the bottoms of such artificial reefs can be relatively small. As such, they can sink into the ocean floor or become swept away with strong ocean currents. As such, a need has developed so as to provide an artificial reef which overcomes the problems associated with the prior art.

In the past, a variety of patents have issued with respect to such artificial reefs. For example, U.S. Pat. No. 2,069,715, issued on Feb. 2, 1937 to J. P. Arpin, is an early patent dealing with artificial reefs. This structuring includes an elongated U-shaped member that is substantially triangular in cross-section and hollow. The outer longitudinal edges at the base portion have inclined soil-penetrating toes. The portion of the base intermediate the longitudinal edges are provided with penetrating lugs.

U.S. Pat. No. 3,888,209, issued on Jun. 10, 1974 to E. R. Boots, describes a method and apparatus for preventing erosion of a beach. This method and apparatus includes an artificial reef for subsurface placement adjacent a shoreline. The artificial reef is made of a base reef set on the seabed and an upper reef preformed and mounted to the base reef.

U.S. Pat. No. 4,997,311, issued on Mar. 5, 1991 to T. A. Van Doren, describes an artificial reef that employs a dome-shaped, thin-walled enclosure of plastic material having apertures therein to permit aquatic life to enter and exit. The enclosure has a circular perimeter that is provided with a circumferential trough integrally formed with the enclosure. A concrete ballast is poured into the trough to form a perimetrical weight which holds the reef in position on the desired underwater surface.

U.S. Pat. No. 5,173,006, issued on Dec. 22, 1992 to W. R. Lowe, provides an artificial reef structure in the form of a truncated pyramid structure. This artificial reef is assembled on site. The artificial reef structure is comprised of identical panels forming openings at the top and bottom of the artificial reef and forming an opening in the side of the artificial reef at a variable distance from the bottom of the structure so as to control the sinking of the structure and the sand held by the structure.

U.S. Pat. No. 5,259,695, issued on Nov. 9, 1993 to B. J. Mostkoff, provides an artificial reef having an equilateral tetrahedron and having four equilateral sides in which an equilateral triangle is disposed. Tire chips are placed within the artificial reef and held in place by cement. The artificial reef is formed with an open-ended three-sided mold.

U.S. Pat. No. 5,454,665, issued on Oct. 3, 1995 to R. K. Hughes, shows an artificial reef for use in a body of water. The reef is formed by providing an anchoring structure which is submerged. The anchoring structure has a weight sufficient to anchor the artificial reef to the floor of the body of water. Each of the reef assemblies is formed from a base which is secured to the anchoring structure. A flexible elastomeric sleeve is coupled to a lower end of a buoyant elongated member formed from a substantially rigid polymeric material so that the elongated members are held in a generally upright position.

U.S. Pat. No. 6,464,429, issued on Oct. 15, 2002 to M. D. Moore, provides an artificial reef module for coral reef remediation. The artificial reef includes a central body having an upper settling plate, a middle settling plate, and a lower settling plate. A plurality of primary tines extend from the central body and include a plurality of secondary tines extending therefrom. The primary tines include the supporting tines, the stabilizing tines, and the space-filling tines. The branching of these tines closely replicates the appearance of natural branching coral.

U.S. Pat. No. 6,896,445, issued on May 24, 2005 to E. Engler, discloses a modular artificial reef that can be placed in stacked structures along the floor of a body of water. The artificial reef includes a top wall, a bottom wall and opposed sidewalls and end walls which are interconnected to form a hollow interior. Each of the walls is formed with one or more openings having a size suitable to allow access by marine life and to permit the passage of sunlight therein.

U.S. Pat. No. 7,828,493, issued on Nov. 9, 2010 to C. Brignac, describes an artificial reef structure that utilizes an axle rod supporting a plurality of buoyant reef bodies rotatably mounted on the axle rod. The axle rod and buoyant sections are suspended at a desired level above a water bottom by anchors attached to the anchor lines. A plurality of distally projecting rods is mounted on the buoyant reef bodies.

U.S. Pat. No. 6,186,702, shows another type of artificial reef. The artificial reef is created by pouring concrete into a mold comprised of an inner form and an outer formed with multiple blockout creating triangular windows. This artificial reef is deployed alone or with a smaller scale reef inside for fitted with shelves. This is a relatively complex design which is difficult to deploy correctly and easily. The configuration has a smooth surface that is not conducive to attracting marine growth.

U.S. Pat. No. 7,513,711, describes another type of artificial reef. This artificial reef employs the use of soft limestone rock on surface panels. The construction method utilized is a costly and time-consuming method that requires casting six structural elements separately and casting three panels separately. Once all of the components are cured sufficiently over a period of days, they can be lifted and placed together so as to be cast together as a single unit.

It is an object of the present invention to provide a process for forming an artificial reef which minimizes the time and labor requirements for the formation of the artificial reef.

It is another object of the present invention to provide a process for the forming of an artificial reef that avoids any welding.

It is still another object of the present invention to provide a process for forming an artificial reef which minimizes the amount of steel and avoids the cost of steel.

It is still another object of the present invention to provide a process for forming an artificial reef in which the artificial reefs can be stacked one upon the other.

It is another object of the present invention to provide an artificial reef which includes limestone surfaces suitable for allowing marine organisms and microorganisms to hold onto.

It is a further object of the present invention to provide a process for forming an artificial reef which creates a large footprint in order to avoid sinking into the floor of the body of water or being swept away by ocean currents.

It is another object of the present invention to provide a process for the forming of an artificial reef in which the artificial reef is attractive to marine life.

It is still further object of the present invention to provide a process for the forming of an artificial reef which provides greater longevity to the artificial reef.

It is another object of the present invention to provide a process for the forming of an artificial reef in which the artificial reef is stronger than prior artificial reef structures.

It is still another object of the present invention to provide a process for the forming of an artificial reef which creates an artificial reef which allows for water circulation therethrough and for small animals to enter.

It is still a further object of the present invention to provide a process for the forming of an artificial reef which effectively allows for the escape of turtles from the interior of the artificial reef.

These and other objects and advantages of the present invention will become apparent from a reading of the attached specification and appended claims.

BRIEF SUMMARY OF THE INVENTION

The present invention is a process for forming an artificial reef that includes the steps of: (1) forming a form having a geometric shape; (2) applying at least one blockout onto a surface of the form such that the blockout extends outwardly of the surface of the form; (3) applying a sprayable concrete over the form and the blockout; (4) curing the sprayable concrete on the form for a period of time; (5) removing the blockout from the surface of the form and from the cured sprayable concrete; and (6) removing the form from the cured sprayable concrete.

In the process of the present invention, a rod can be applied onto the form so as to have a portion extending outwardly of the surface of the form. In particular, this rod is a metal rebar. The metal rebar is bent into an inverted V-shaped configuration. The rebar is applied on to the form such that the bent portion of the rebar, or a flexible metal cable, extends outwardly above a top of the form. Additionally, the concrete is sprayed onto the form below the bent portion of the rebar.

The step of forming the form includes a forming a generally pyramid-shaped form having an upper end and a lower end. A base is formed having a bottom surface and an upper surface. The lower end of the pyramid-shaped form is positioned upon the upper surface of the base. At least one block is applied onto the upper surface of the base beyond the perimeter of the lower end of the pyramid-shaped form. The sprayable concrete is sprayed over the upper surface of the base and over at least a portion of the block.

The blockout is a cylindrically-shaped member. An end of the cylindrically-shaped member is affixed to the surface of the form such that the cylindrically-shaped member extends outwardly of the surface of the form. Additionally, or alternatively, the blockout be a triangular-shaped member or a square-shaped member. This triangular shaped member can be affixed to the surface of the form so as to extend outwardly therefrom.

In the present invention, a plurality of limestone surfaces are applied onto an outer surface of the sprayable concrete during the step of curing. These limestone surfaces can be in the nature of calcium carbonate structures or limestone rocks. These limestone surfaces should substantially cover the exterior of the sprayable concrete.

Additionally, in order to facilitate the release of the concrete from the form, a concrete release agent is applied to the form prior to the step of applying the sprayable concrete.

The present invention effectively serves to overcome the problems associated with the prior art. In particular, the use of a sprayable concrete, such as gunite or shotcrete, provides a superior technique in terms of cost, durability, and strength. This technique also allows for the creation of the maximum available surface area of limestone rock thereon so as to successfully promote marine growth. The process of the present invention creates an artificial reef for the purposes of attracting marine growth, such as corals, fans, banacles and other aquatic life. This, in turn, can form the foundation upon which a balanced reef ecological system can thrive in order to enhance a full spectrum of marine life deployment, from benthic worms to large plagic fish. By providing the maximum surface area of limestone, which is comprised of at least 80% calcium carbonate, these artificial reefs will provide a naturally-occurring compound found in the marine environment that marine wildlife can bore into or attach themselves to gain a foothold on life.

The foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
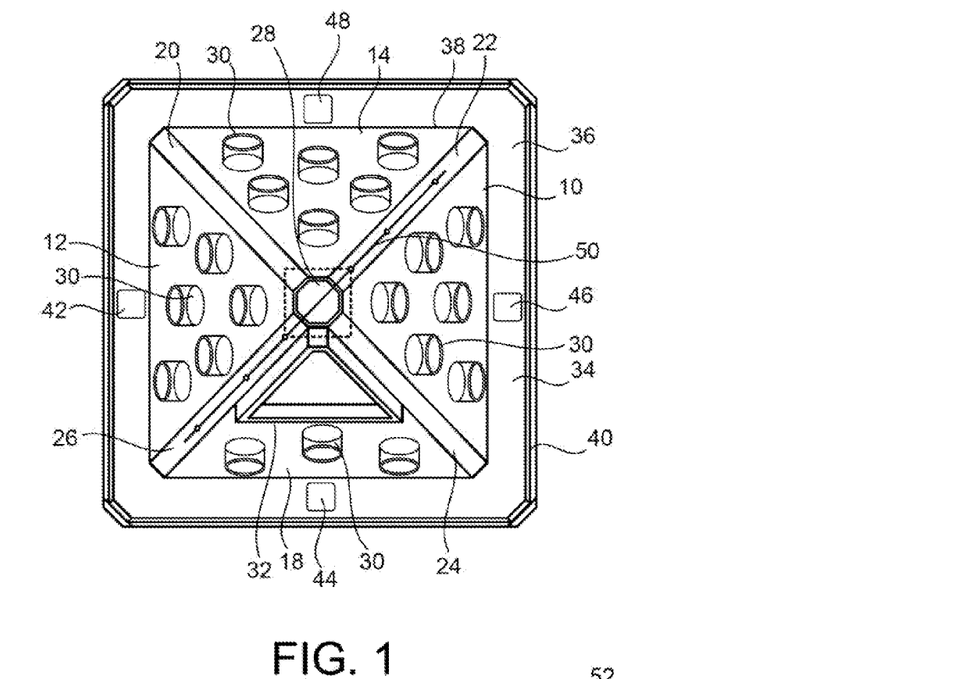
FIG. 1 is a plan view showing the form as used in the process for forming an artificial reef in accordance with the present invention.

Referring to FIG. 1, there is shown the form 10 as used for the formation of the artificial reef in accordance with the present invention. The form 10 has a geometric shape. In FIG. 1, this geometric shape is in the nature of a pyramid shape. However, within the concept of the present invention, various other shapes could also be employed. The form 10 has a plurality of surfaces 12, 14, 16 and 18 thereon. A corner surface 20 extends between surface 12 and surface 14. A corner surface 22 extends between surface 14 and surface 16. A corner surface 24 extends between surface 16 and surface 18. A corner surface 26 extends between surface 12 and surface 18. Ultimately, the upper end 28 is relatively flat. As such, the form has a truncated pyramidal shape.

FIG. 1 shows that there are a plurality of blockouts 30 distributed along the surfaces 12, 14, 16 and 18. Each of the blockouts 18 is illustrated as being of a generally cylindrical shape. In particular, the cylindrically-shaped blockouts 30 can be in the nature of buckets that have a slightly tapered outer diameter. As such, the narrow and of such a blockout 30 is affixed against the respective surfaces 12, 14, 16 and 18. Where plastic buckets are used, these can be attached by simply using a nail or a wood screw so as to attach the base of the bucket to the respective surfaces of the form 10. In other circumstances, these members 30 can be specially designed cylindrically-shaped elements that can be affixed to the surface by other means. As an alternative, each of the surfaces 12, 14, 16 and 18 can have openings that accommodate the ends of each of the blockouts 30. These openings can be threaded so that each of lockouts can be suitably screwed into a position. In other circumstances, where the surfaces 12, 14, 16 and 18 are formed of a metal, then the blockouts 30 can have suitable magnets attached thereto which secure each of the blockouts 30 to the respective surfaces 12, 14, 16 and 18. Each of the blockouts 30 extend outwardly of the respective surfaces 12, 14, 16 and 18 for a desired distance.

In FIG. 1, it can be seen that there is a triangular-shaped blockout 32 that is affixed to the surface 18. The triangular-shaped blockout 32 has a narrow end adjacent to the upper and 28 of the form 10. The triangular-shaped blockout 32 is designed as a turtle escape opening in the artificial reef. The triangular-shaped blockout 32 can be attached to surface 18 in any of the manners described hereinbefore.

FIG. 1 shows that there is a base 34 that has an upper surface 36. The bottom 38 of the form 10 is placed upon the upper surface 36 of the base 34. The upper surface 36 of the base 34 is a planar surface having an area greater than the area of the bottom 38 of the form 10. A lip 40 extends upwardly around the perimeter of the base 34. A plurality of blocks 42, 44, 46 and 48 are positioned on the upper surface 36 of the base 34 in a space between the perimeter of the bottom 38 of the form 10 and the lip 40 of the base 34. Blocks 42, 44, 46 in 48 extend upwardly. As will be described hereinafter, these blocks 42, 44, 46 and 48 serve to provide a service whereby one artificial reef can be stacked upon a lower artificial reef.

FIG. 1 further illustrates that there is a rod 50 that extends over the corner surface 22 and 26 and over the upper surface 28 of the form 10. This rod 50 can be in the nature of a metal rebar that has been bent so as to conform to the shape of the form 10. Alternatively, a metal cable could be used.

Figure 2:
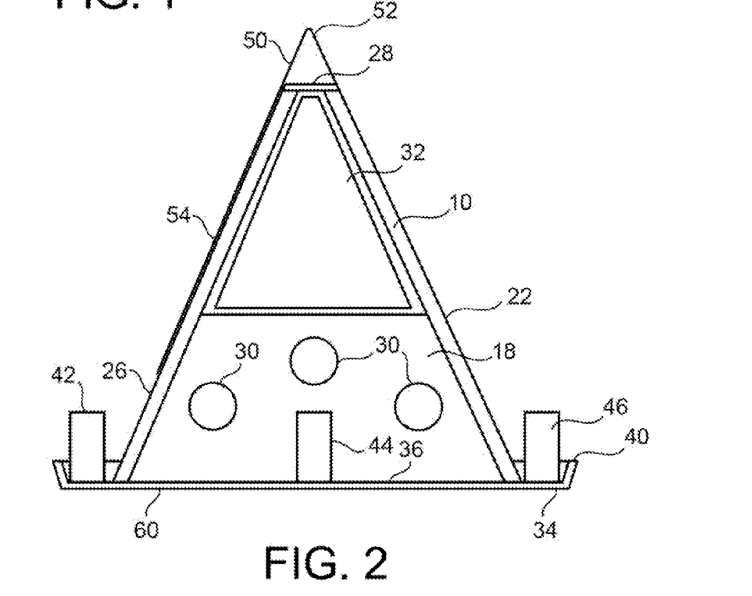
FIG. 2 is a side elevational view showing the form as used in the process for the forming of an artificial reef in accordance with the present invention.

FIG. 2 shows the form 10 from a side view. It can be seen in FIG. 2 that the form 10 has a truncated pyramidal shape. The rod 50 is illustrated as having a portion 52 extending above the upper surface 28 of the form 10. The rod 50 is a bent rebar that has a portion 54 extending along with a corner surface 26 and another portion extending along the corner surface 22. This rod 50 can be suitably positioned, if desired, through the use of chairs used for the support of rebars in construction. Otherwise, the rod 50 can simply lay against the corner surface.

FIG. 2 further shows the triangular blockout 32 and the cylindrically-shaped blockouts 30 that are arranged on the surface 18 of the form 10. The base 34 is illustrated as having a planar top surface 36 and a planar bottom surface 60. The blocks 42, 44 and 46 are positioned on the planar upper surface 36 of the base 34 and positioned inwardly of the lip 40.

Figure 3:
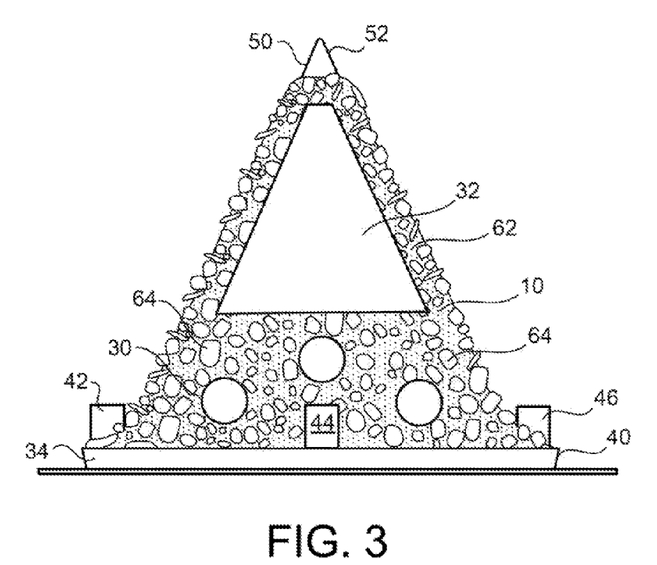
FIG. 3 is a side elevational view showing an intermediate step in the process of forming an artificial reef in accordance with the present invention.

FIG. 3 shows that a sprayable concrete 62 has been sprayed onto the surfaces of the form 10. The sprayable concrete can be sprayed over the triangular-shaped blockout 32 and over the cylindrically-shaped lockouts 30. The sprayable concrete is in the nature of gunite or shotcrete. The sprayable concrete preferably contains an embedded fiber mesh material that enhances the structural integrity of the structure and minimizes or eliminates the need for the use of steel rebar. This sprayable concrete is dispensed by pneumatic energy so as to be distributed over the outer surfaces of the form 10. The sprayable concrete also serves to fill the area between the lip 40 of the base 34 and over at least a portion of the blocks 42, 44 and 46. The sprayable concrete is retained within the base 34 by the lips 40. The upper end 52 of rod 50 extends outwardly and above the sprayable concrete 62. Importantly, in FIG. 3, there are plurality of limestone surfaces 64 distributed substantially over the exterior of the sprayable concrete 62. After the sprayable concrete 62 has been sprayed onto the form 10, these limestone surfaces 64 can be manually positioned thereon during the curing process. As such, these limestone surfaces 64 can be properly retained in possession. The limestone surfaces 64 can be in the nature of any form of calcium carbonate and, in particular, in the nature of limestone rocks. As such, these limestone surfaces 64 provide a biocompatible material for the exterior of the artificial reef.

Figure 4:
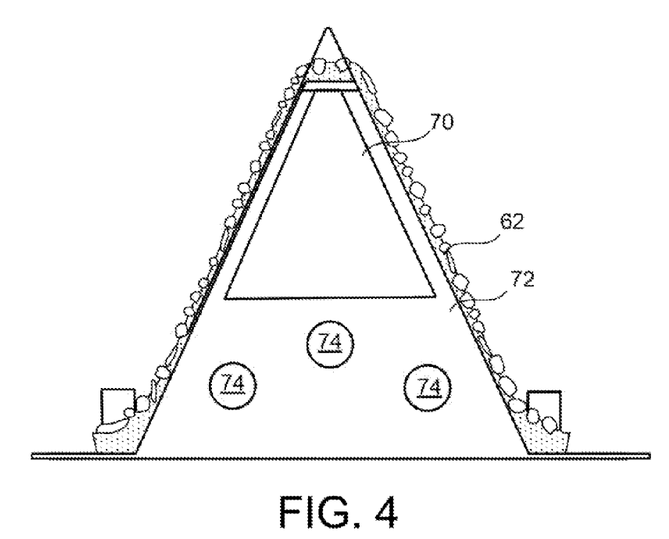
FIG. 4 shows a further step in the process of forming an artificial reef in accordance with the teachings of the present invention.

FIG. 4 illustrates that the triangular blockout 32 has been removed. Additionally, the triangular blockout 32 has been removed and also the cylindrical blockouts have been removed. As such, a void or opening 70 is formed on the surface 72 of the artificial reef. Additionally, openings 74 are also formed through the sprayable concrete 62 so as to open to the interior of the artificial reef. As stated hereinbefore, after the sprayable concrete 62 has cured, the cylindrical blockouts can be removed by simply unscrewing the wood screw and pulling the buckets from their position against the form. Similarly, the triangular-shaped blockout 32 can be removed in a similar manner. Since each of the cylindrical lockouts and the triangular blockouts have a tapered outer diameter, they can be easily and conveniently removed from the cured concrete 62.

Figure 5:
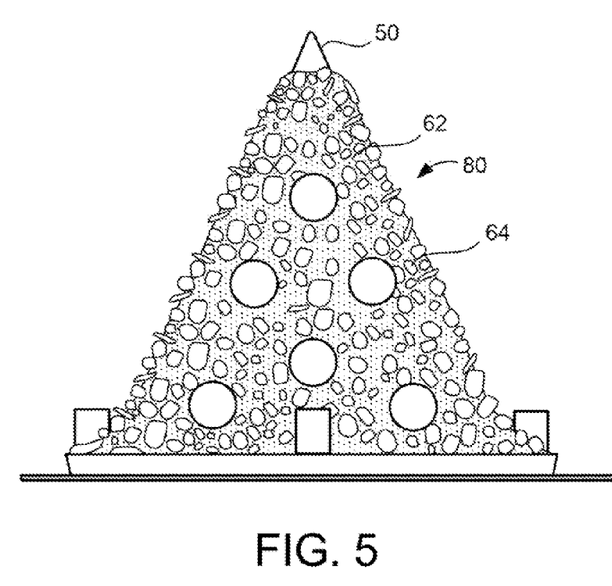
FIG. 5 is a side elevational view showing the completion of the artificial reef in accordance with the present invention.
Figure 6:
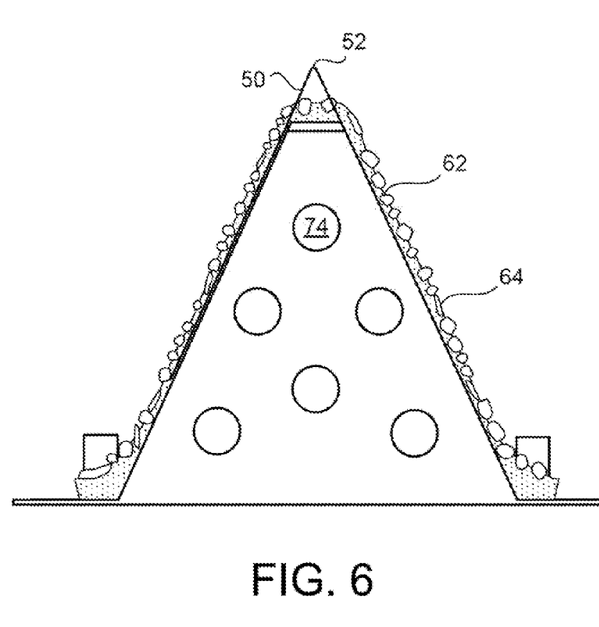
FIG. 6 is a cross-sectional view showing the interior of the artificial reef of the present invention.

FIG. 5 shows an opposite side view of the artificial reef 80 of the present invention. It can be seen that the limestone surfaces 64 substantially cover the exterior surfaces of the sprayable concrete 62. The various cylindrically-shaped lockouts remain so as to allow the concrete 62 to cure in a proper position. FIG. 6 shows that the that the openings 74 are formed in those areas where the cylindrically-shaped blockouts previously resided.

Figure 7:
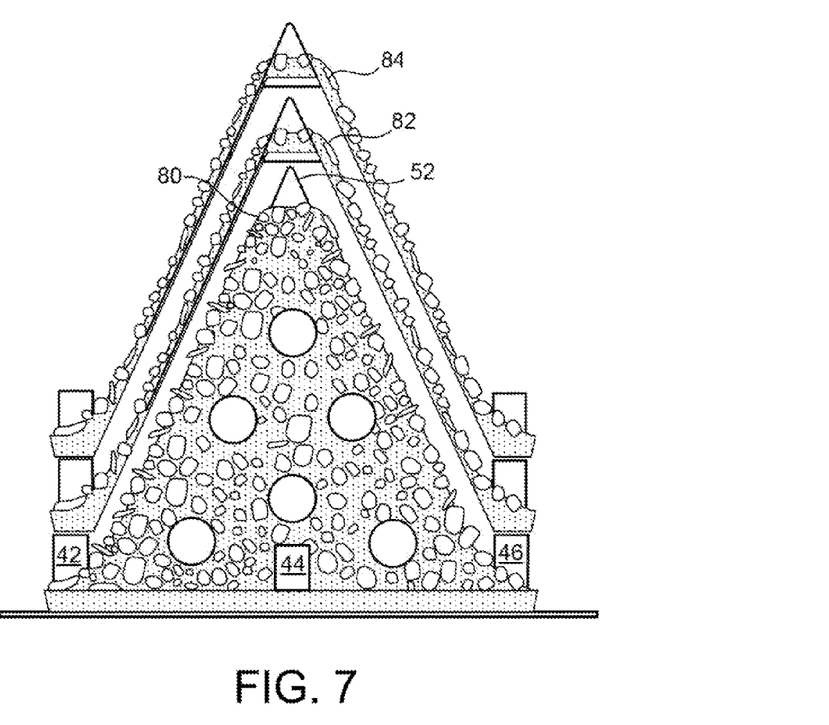
FIG. 7 shows the stackable relationship between artificial reefs as created by the process of the present invention.

FIG. 7 shows a stacked arrangement of artificial reefs 80, 82 and 84. Artificial reef 82 has blocks 42, 44 and 46 extending upwardly from the bottom thereof. The bottom of the artificial reef 82 can reside on the top of the blocks 42, 44 and 46. Similar blocks are formed adjacent to the bottom of the artificial reef 82 so as to support the bottom of the artificial reef 84 in a stacked configuration. The bent portion 52 of the rod 50 can be used so as to lift each of the artificial reefs 80, 82 and 84 from the positions illustrated in FIG. 7 or to deposit such artificial reefs in their stacked configuration. Additionally, this bent portion 52 of the rod 50 can also be used so as to effectively separate the artificial reef from the underlying form. Under such circumstances, a concrete release agent can be sprayed over the exterior surface of the form 10 so as to facilitate the release of the concrete structure from the underlying form.

Figure 8:
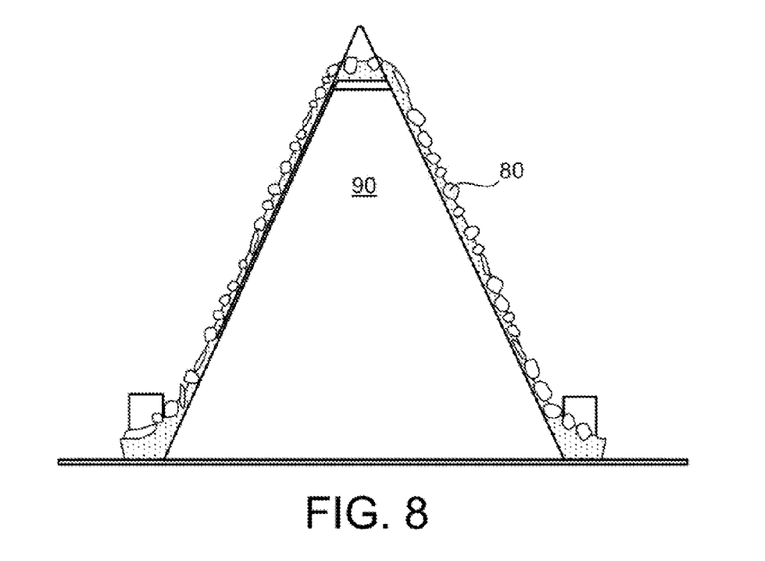
FIG. 8 is a cross-sectional view of the artificial reef as created by the present invention.

FIG. 8 illustrates a cross-sectional view of the artificial reef 80. As can be seen, there is a pyramidal-shaped interior 90 which was previously occupied by the form 10. As such, the various openings that were created through the use of the blockouts can communicate with the interior 90 so as to allow small fish and organisms to swim therein. In particular, this allows for a small fish to develop and to seek refuge therein by preventing large fish from entering the interior of the artificial reef 80. As such, the present invention effectively promotes marine growth.

Figure 9:
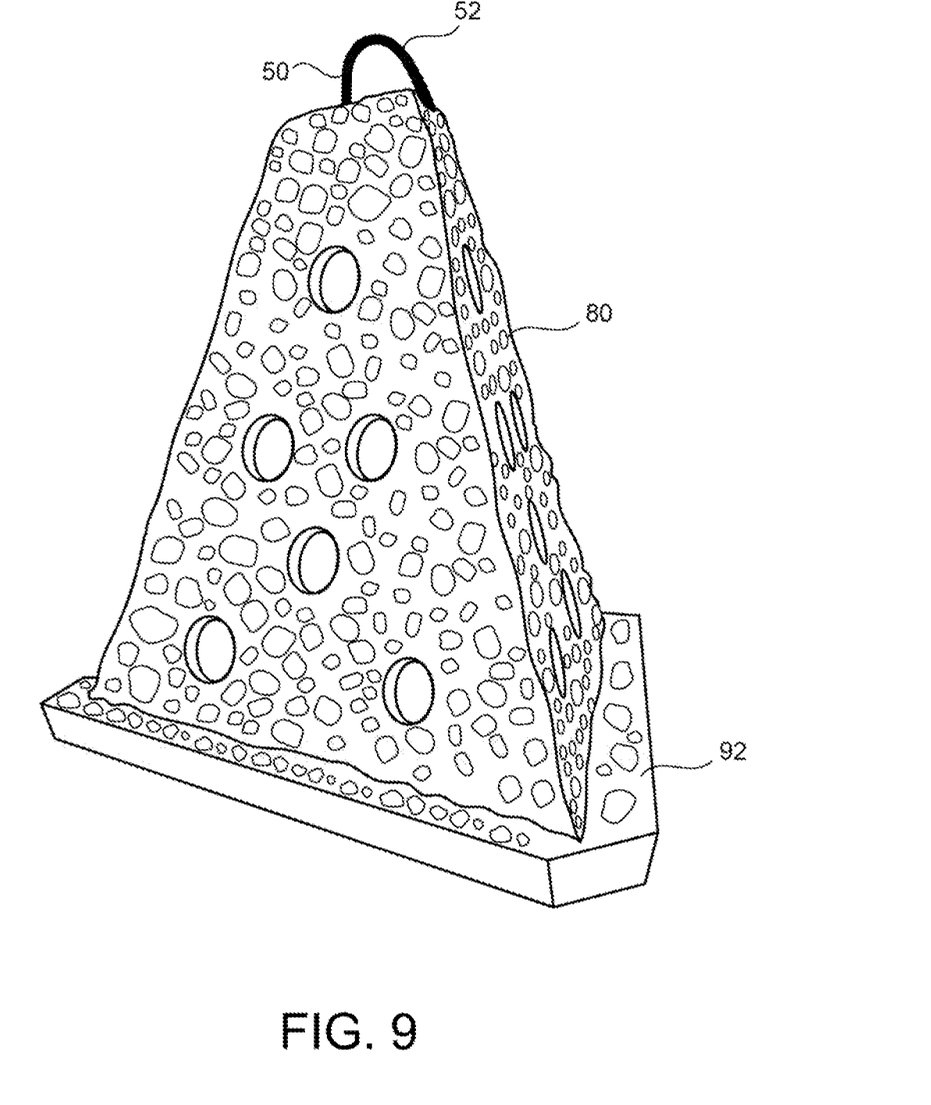
FIG. 9 is a perspective view showing the process for forming an artificial reef in accordance with the present invention.

FIG. 9 is a perspective view showing the artificial reef 80. As can be seen, the artificial reef 80 has a generally truncated pyramidal shape. A bottom surface 92 is formed so as to extend at the bottom of the pyramid-shaped structure. The base 92 was formed in the space between the lip 40 of the base 34 and the bottom of the pyramid-shaped form 10. As such, the base 92 has a relatively large surface area relative to the bottom of the pyramid-shaped structure 90. This wide area of the base 92 serves to prevent any sinking of the artificial reef 80 into the subsea floor and to prevent any drifting of the artificial reef 80 by way of ocean currents. Further, the wide area provides additional surface area for the limestone.

In FIG. 9, it can be seen that the bent portion 52 of the rod 50 extends upwardly above the top end of the artificial reef 80. This rod 50 facilitates the ability to properly manipulate the artificial reef 80. As such, a suitable crane can be used offshore so as to deploy the artificial reef 80. It is necessary to move the artificial reef 80, then a hook can be utilized so as to grasp the bent portion of the rod 52 for the lifting and maneuvering of the artificial reef 80.

The artificial reef 80 is constructed of gunite or shotcrete which is designed to provide a hard substrate for the purpose of attracting marine growth such as algae, truncates, hard and soft corals, fans, sponges, barnacles, oysters and other aquatic life. The structure can be manufactured in a variety of shapes such as tetrahedrons, cones, cubes, cylinders, domes, or other shapes. The openings on each face of the artificial reef 80 can also be of different shapes such as circles, squares, rectangles, triangles, etc. Calcium carbonate components, such as limestone and/or oyster shell, are an integral component of the surface. Such calcium carbonate components provide almost 100% coverage of the surface. This provides additional surface area and a suitable material with a proper pH for marine growth. The use of gunite as the primary structural element allows the unit to be constructed in one step instead of the multiple steps required by other artificial reefs. This provides a substantial savings in time and cost during the manufacturing process. Additionally, the artificial reef 80 is stronger has greater longevity than previous artificial reefs.

Since the artificial reef 80 of the present invention utilizes a minimal amount of metal or steel, there is little (in the case where minimal amount of metal rebar is used) or no metal or steel to degrade over time in seawater. As such, the structural integrity of the artificial reef 80 will have enhanced longevity. The surface area of the footprint of the artificial reef 80 serves to prevent subsidence or scouring in comparison with previous artificial reef designs. The openings in each wall of the artificial reef 80 allow for an adequate water circulation. This promotes entry into the interior by smaller fish. As such, such smaller fish are provided with refuge and protection from predation. The openings have been created by the blockouts can be of any shape, number, or size. These blockouts to be removed prior to lifting the reef off of the form. The steel reinforcing rod is embedded into and along the length of opposing edges of the artificial reef in order to provide a method of lifting the reef from the form and a method for allowing the artificial reef to be properly positioned.

The foregoing disclosure and description of the invention is illustrative and explanatory thereof. Various changes in the steps of the described process can be made within the scope of the present invention without departing from the true spirit of the invention. The present invention should only be limited by the following claims and their legal equivalents.

We claim:

1. A process for forming an artificial reef, the process comprising:
    forming a generally pyramid-shaped form having an upper end and a lower end;
    forming a base having a bottom surface and an upper surface;
    positioning said lower end of said pyramid-shaped form upon said upper surface of said base;
    applying at least one block onto said upper surface of said base;
    applying at least one blockout onto a surface of said form, the blockout extending outwardly of said surface of said form;
    applying a sprayable concrete over said form and the blockout and over said upper surface of said base and over at least a portion of the at least one block;
    curing the sprayable concrete on said form for a period of time;
    removing the blockout from the surface of the form and from the cured sprayable concrete; and
    removing the form from the cured sprayable concrete.

2. The process of claim 1, further comprising:
    applying a rod onto said form, said rod extending outwardly of the surface of said form.

3. The process of claim 2, said rod being a metal rebar, the step of applying comprising:
    bending the rebar into an inverted V-shaped configuration; and
    applying the rebar onto the form such that the bend portion of said rebar extends outwardly above a top of said form.

4. The process of claim 3, the step of applying the sprayable concrete comprising:
    spraying the sprayable concrete onto said form below the bend portion of the rebar.

5. The process of claim 1, the blockout being a cylindrically-shaped member, the step of applying at least one blockout comprising:
    affixing an end of the cylindrically-shaped member to the surface of the form.

6. The process of claim 1, the blockout being a triangular-shaped member, the step of applying at least one blockout comprising:
    affixing a surface of the triangular-shaped member to the surface of the form, said triangular shaped member extending outwardly of the surface of the form.

7. The process of claim 1, further comprising:
    applying a plurality of limestone surfaces onto an outer surface of the sprayable concrete during the step of curing.

8. The process of claim 1, further comprising:
    applying a concrete release agent to said form prior to the step of applying the sprayable concrete.

* * * * *

UNITED STATES PATENT AND TRADEMARK OFFICE
CERTIFICATE OF CORRECTION

PATENT NO. : 9,403,287 B2
APPLICATION NO. : 14/938543
DATED : August 2, 2016
INVENTOR(S) : Hilton et al.

Page 1 of 1

It is certified that error appears in the above-identified patent and that said Letters Patent is hereby corrected as shown below:

On the Title Page

Item (71) Applicants is corrected to read:
-- Thomas J. Hilton, Arcola (TX);
Wayne Evan Bauer, Cape Coral (FL) --.

Item (72) Inventors is corrected to read:
-- Thomas J. Hilton, Arcola (TX);
Wayne Evan Bauer, Cape Coral (FL) --.

Signed and Sealed this
Third Day of December, 2019

Andrei Iancu
*Director of the United States Patent and Trademark Office*